Feb. 26, 1952  C. A. GIAUQUE  2,587,569
VALVE BODY WITH PROJECTING SEAT
Filed Nov. 30, 1945
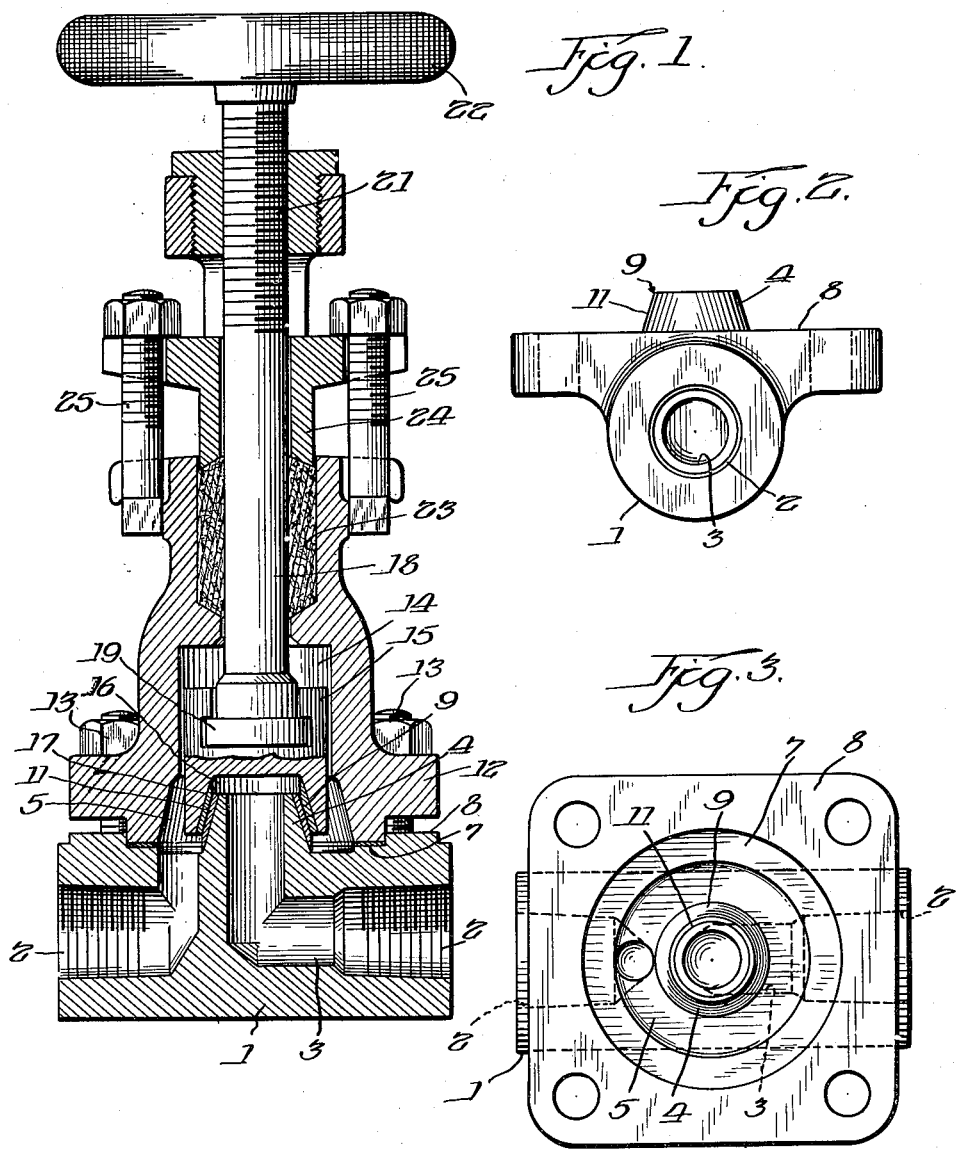
Inventor:
Charles A. Giauque:
By: Joseph O. Lange, Atty.

Patented Feb. 26, 1952

2,587,569

UNITED STATES PATENT OFFICE 2,587,569

VALVE BODY WITH PROJECTING SEAT

Charles A. Giauque, Berwyn, Ill., assignor to Crane Co., Chicago, Ill., a corporation of Illinois Application November 30, 1945, Serial No. 631,879

1 Claim. (Cl. 251—156)

This invention relates to valves and more specifically it is concerned with a novel form of valve structure in which the valve body is suitably formed so as to enable the operation of affixing valve seats more effectively than heretofore accomplished.

In order to obtain a true appreciation of my invention it should be understood that heretofore there has been a very serious problem in applying hardened valve seats successfully as, for example, by the application of weld deposited metal such as Stellite. Conventional valve body design and shapes have not been conducive to making such deposits and since valve seats are extremely critical in their requirement for a uniform structure these past failures have been serious and consequently very expensive. In mose cases the valve seats have been positioned sufficiently far below the valve bonnet facing that it was virtually impossible to reach conveniently the valve seats by suitable weld deposits. As a result there have been valve bodies badly impaired or even permanently ruined because of the excessive application of heat in performance of the foregoing operation.

By the novel construction hereinafter described these objections have been overcome and not only is the valve seat more easily weld deposited but the valve seats have also been rendered more easily machinable for the very fine finishes usually necessary.

Other objectives and advantages flowing from the use of my device will become apparent in reading the following specification in light of the accompanying drawings in which Fig. 1 is a sectional assembly view of a valve embodying my invention.

Fig. 2 is an end view of the valve body referred to in Fig. 1.

Fig. 3 is a plan view of the valve body of Fig. 2.

Referring now to Fig. 1, the valve embodying my invention is shown to have a body 1 with the end connections 2 which may be either flanged, screwed, welded or otherwise formed depending upon the service requirements encountered, and with a valve port 3 extending to the valve seat 4, with a suitable connection through the chamber 5 with the opposite side of the valve. In this novel body construction I propose to make the valve seat 4 with an upwardly projecting portion, the latter extending substantially above the bonnet connection 7 and also above the top of the flanges 8. Preferably, although not necessarily, the surface 9 may be made frusto-conical with suitable hard facing 11 such as "Stellite" for example, applied by weld deposit methods. The seat may of course be made with other forms of seat shapes such as flat, round, and the like without affecting the application of the invention.

Adjacent the abutting bonnet connections 7 is the bolted bonnet 12 held to the body 1 by means of the bolt studs 13. The bonnet 12 is preferably provided with a hollow portion or chamber 14 within which is the disc or closure member 15 having an inner end chamber 16 and preferably, although not necessarily provided with a facing 17. The disc is mounted for reciprocable movement within the valve. Rotatably journalled within the bonnet 12 is the stem 18 having at its lower portion a T head 19 for suitable connection to the closure member 15. The upper portion of the stem is threaded as at 21 so that upon rotation of the handwheel 22 the stem will be reciprocably moved for opening and closing the valve. Of course a non-rotatable rising stem may be employed if desired without affecting the scope of this contribution to the art. The upper portion of the bonnet 12 is provided with the usual stuffing box 23 and the gland 24 with the gland T bolts 25 for compressing the packing within the said stuffing box.

It will be apparent that the chambers 5 and 14 cooperate with the projecting valve seat 4 to permit of the use of the latter and also aid in making a compact valve assembly.

It will be further apparent that the structure allows of a relatively easy method of applying the facing 9 to the exposed projecting valve seat 4. At the same time the structure providing the chamber 5 above the seat and within the bonnet 12 permits of the use of a novel disc or valve closure construction in combination therewith, protecting the chamber 5 against severe erosion and permitting substantial flow through the body under high temperature and high pressure conditions.

Obviously the invention is capable of being applied to other forms of valve constructions, as for example with an angle or cross valve body, with equally desirable or beneficial results.

To those skilled in the art it will be quite apparent that the invention is capable of a wide variety of applications and it is therefore the desire not to be limited beyond the terms of the appended claim.

I claim:

In a valve construction, the combination including a body with an inlet and outlet and a valve seat in the said body, a closure member, a bonnet for the said valve body having annularly arranged apertures and a plurality of means for attachment with said body and an abutting annular flange forming a connection on abutting surfaces between the said valve body and bonnet, the bonnet flange having the annularly arranged apertures to receive said plurality of annularly arranged attachment means for engagement with said body, the said bonnet having adjacent the said body connection and abutting surfaces an annular chamber of frusto-conical form, the largest outer diameter thereof being defined by the inside diameter of the abutting surfaces of said annular flange connection with the body, the said valve seat projecting beyond the abutting surfaces of said bonnet connection into the valve bonnet chamber to define substantially the smallest diameter of the said annular bonnet chamber, the said chamber having its lower or base portion defined by an upper annular part of the body adjacent the said seat and the abutting surfaces of the annular connection between the body and bonnet, a relieved part of the bonnet chamber forming a passage between the said seat and the body inlet and outlet, the said closure member being guided within an upper cylindrical portion of the bonnet chamber and being provided with a frusto-conical recess defined by an annular lip to deflect flow past the seat downwardly into the relieved part of the bonnet and into the said passage, the tapered walls of the frusto-conical recess of the closure member when the latter is in open position forming a continuation of the tapered walls defining the lower or base portion of the bonnet chamber, and in the closed position of the valve, the said tapered walls of the frusto-conical recess of the closure member engaging the said valve seat whereby to align and center the said bonnet attachment means with the said body.

CHARLES A. GIAUQUE.

REFERENCES CITED

The following references are of record in the file of this patent:

UNITED STATES PATENTS

| Number | Name | Date |
|---|---|---|
| 605,389 | Callanan | June 7, 1898 |
| 1,000,799 | Grimes | Aug. 15, 1911 |
| 1,036,006 | Riess | Aug. 20, 1912 |
| 1,520,694 | Butler | Dec. 30, 1924 |
| 1,618,844 | Owen | Feb. 22, 1927 |

FOREIGN PATENTS

| Number | Country | Date |
|---|---|---|
| 307,614 | Great Britain | of 1928 |
| 560,321 | France | of 1923 |